United States Patent
Padberg et al.

(10) Patent No.: US 8,066,784 B2
(45) Date of Patent: Nov. 29, 2011

(54) METHOD FOR THE PRODUCTION OF MEMBRANE/ELECTRODE UNITS

(75) Inventors: Christoph Padberg, Wiesbaden (DE); Jürgen Sinschek, Frankfurt (DE); Torsten Raap, Frankfurt (DE); Ulf Hofmann, Frankfurt (DE)

(73) Assignee: BASF Fuel Cell GmbH, Frankfurt (DE)

( * ) Notice: Subject to any disclaimer, the term of this patent is extended or adjusted under 35 U.S.C. 154(b) by 295 days.

(21) Appl. No.: 11/572,040

(22) PCT Filed: Jul. 14, 2005

(86) PCT No.: PCT/EP2005/007689
§ 371 (c)(1),
(2), (4) Date: May 8, 2007

(87) PCT Pub. No.: WO2006/008075
PCT Pub. Date: Jan. 26, 2006

(65) Prior Publication Data
US 2008/0038613 A1 Feb. 14, 2008

(30) Foreign Application Priority Data

Jul. 15, 2004 (DE) .......................... 10 2004 034 139

(51) Int. Cl.
*H01M 4/82* (2006.01)
*H01M 6/00* (2006.01)

(52) U.S. Cl. .......... 29/623.1; 29/730; 29/623.2; 429/33; 204/252

(58) Field of Classification Search ................ 29/623.1, 29/730, 623.2; 204/252; 429/33
See application file for complete search history.

(56) References Cited

U.S. PATENT DOCUMENTS

| 392,512 | A | 11/1888 | Hamblin |
| 4,017,664 | A | 4/1977 | Breault |
| 4,191,618 | A | 3/1980 | Coker et al. |
| 4,212,714 | A | 7/1980 | Coker et al. |
| 4,333,805 | A | 6/1982 | Davidson et al. |
| 5,422,411 | A | 6/1995 | Wei et al. |
| 6,024,848 | A * | 2/2000 | Dufner et al. ................. 204/252 |
| 6,110,616 | A | 8/2000 | Sheikh-Ali et al. |
| 6,475,249 | B1 * | 11/2002 | Hsu et al. ..................... 29/623.1 |
| 7,378,172 | B2 * | 5/2008 | Chang et al. .................. 429/492 |

(Continued)

FOREIGN PATENT DOCUMENTS

DE 450849 A2 10/1991

(Continued)

OTHER PUBLICATIONS

Costamagna, P. et al, "Quantum jumps in the PEMFC science and technology from the 1960s to the year 2000—Part I. Fundamental scientific aspects", Journal of Power Sources, Elsevier, Amsterdam, NL, vol. 102, No. 1-2, Dec. 1, 2001, pp. 242-252.

*Primary Examiner* — A Dexter Tugbang
*Assistant Examiner* — Jeffrey Carley
(74) *Attorney, Agent, or Firm* — Hammer & Associates, P.C.

(57) ABSTRACT

The invention relates to a method for production of a membrane/electrode unit, whereby a conducting polymer membrane is compressed with two electrodes until a given compression is achieved. Said method permits an increase in resting voltage of the membrane/electrode unit in use, the amount of damage during production is reduced and a constant thickness within a production run is achieved.

21 Claims, 3 Drawing Sheets

U.S. PATENT DOCUMENTS

Figure 1:
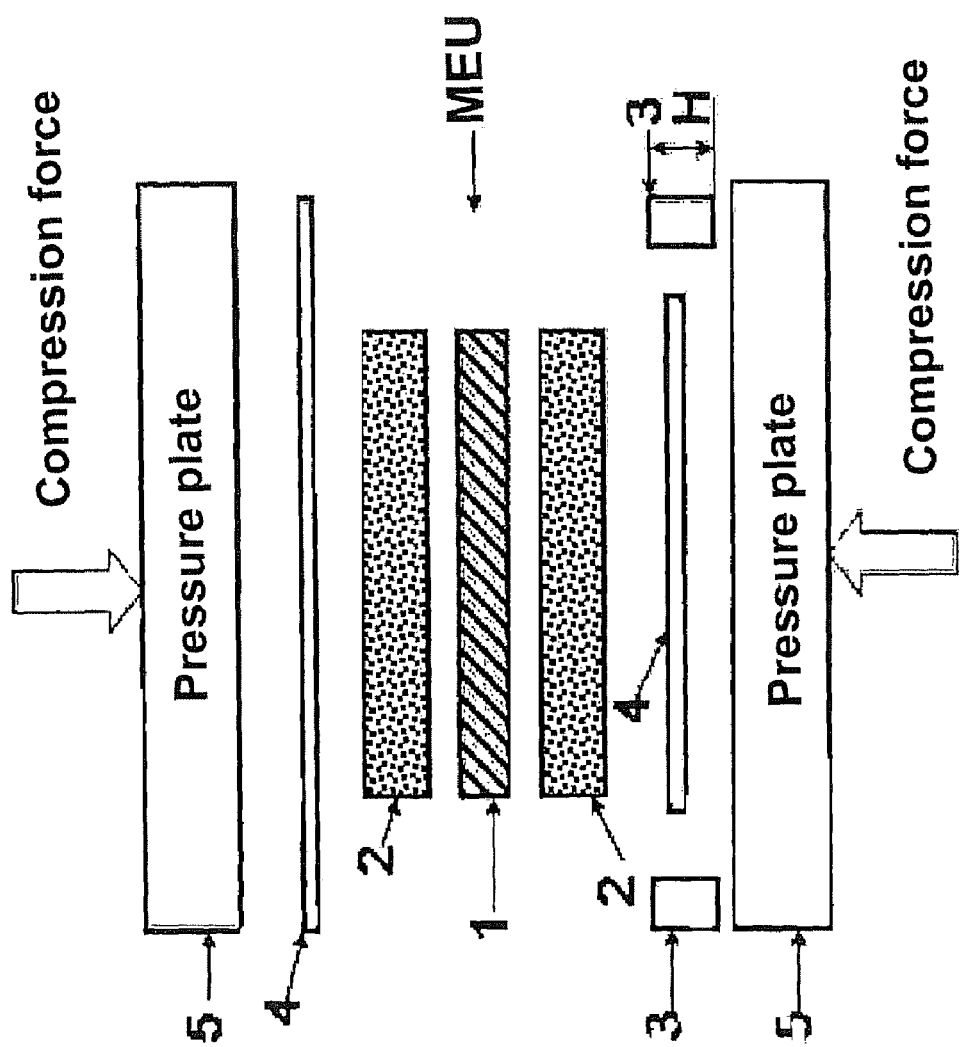

| | | | |
|---|---|---|---|
| 7,604,886 B2 * | 10/2009 | Kim et al. | 429/410 |
| 2003/0041444 A1 * | 3/2003 | Debe et al. | 29/623.1 |
| 2005/0091837 A1 * | 5/2005 | Frank et al. | 29/623.2 |
| 2005/0173061 A1 | 8/2005 | Xie | |
| 2006/0008690 A1 * | 1/2006 | Uensal et al. | 429/33 |
| 2006/0257727 A1 * | 11/2006 | Uetani et al. | 429/144 |

FOREIGN PATENT DOCUMENTS

| | | |
|---|---|---|
| DE | 19509748 A1 | 10/1996 |
| DE | 19509749 A1 | 10/1996 |
| DE | A-19527435 A1 | 1/1997 |
| DE | 19757492 A1 | 7/1999 |
| DE | A-19959289 A1 | 6/2001 |
| DE | 10052242.4 A1 | 5/2002 |
| DE | 10052237.8 A1 | 8/2002 |
| DE | 10109829.4 A1 | 9/2002 |
| DE | 10110752.8 A1 | 9/2002 |
| DE | 10117686.4 A1 | 10/2002 |
| DE | 10117687.2 A1 | 10/2002 |
| DE | 10129458.1 A1 | 1/2003 |
| DE | 10140147.7 A1 | 3/2003 |
| DE | 10144815.5 A1 | 3/2003 |
| EP | 1523057 A1 | 4/2005 |
| JP | 10-125560 | 5/1998 |
| WO | WO 92/15121 | 9/1992 |
| WO | WO 96/01177 | 1/1996 |
| WO | WO 96/13872 | 5/1996 |
| WO | WO 00/26982 | 5/2000 |
| WO | WO 00/44816 | 8/2000 |
| WO | WO 01/18894 A2 | 3/2001 |
| WO | WO 2004/066428 | 8/2004 |

\* cited by examiner

| Compression during MEU-assembly | | Compression in test cell | | Performance | | |
|---|---|---|---|---|---|---|
| Target | Actual | Target | Actual | OCV | Ukl@0,2 A/cm² | Ukl@0,6 A/cm² |
| 1 N/mm² | 1 N/mm² | 30 | 30,0 | 0,849 | 0,675 | 0,568 |
| 30 | 25,2 | | 32,2 | 0,832 | 0,655 | 0,544 |
| 20 | 19,5 | | 32,3 | 0,811 | 0,639 | 0,523 |
| 10 | 10,6 | | 30,6 | 0,872 | 0,645 | 0,544 |
| 1 N/mm² | 1 N/mm² | 20 | 20,0 | 0,893 | 0,642 | 0,534 |
| 30 | 25,7 | | 15,6 | 0,887 | 0,647 | 0,549 |
| 20 | 20,0 | | 20,0 | 0,944 | 0,649 | 0,550 |
| 10 | 13,8 | | 19,0 | 0,886 | 0,650 | 0,546 |
| 1 N/mm² | 1 N/mm² | 10 | 8,6 | 0,871 | 0,642 | 0,530 |
| 30 | 26,2 | | 8,6 | 0,877 | 0,652 | 0,549 |
| 20 | 20,3 | | 7,7 | 0,945 | 0,647 | 0,544 |
| 10 | 12,5 | | 7,4 | 0,932 | 0,639 | 0,529 |

Fig. 2

METHOD FOR THE PRODUCTION OF MEMBRANE/ELECTRODE UNITS

The present invention relates to a method for the production of membrane electrode units especially for those with a high performance that can be utilised especially in so called polymer electrolyte membrane fuel cells where one or more proton conductive polymer membranes are compressed with two or more electrodes.

A fuel cell usually contains an electrolyte and two electrodes separated by the electrolyte, in which one of the two electrodes is supplied with a fuel, such as hydrogen gas or a mixture of methanol and water, and the other electrode is supplied with an oxidant, such as oxygen gas or air. In the process, chemical energy generated by the resulting fuel oxidation is directly converted into electric power.

One requirement to the electrolyte is, that it is permeable to hydrogen ions, i.e. protons, but not to the fuels mentioned above.

Typically, a fuel cell comprises several individual cells, so-called MEUs (membrane electrode unit), each of which contains an electrolyte and two electrodes separated by the electrolyte.

As electrolyte for the fuel cell, solids, such as polymer electrolyte membranes, or liquids, such as phosphoric acid, are applied. Polymer electrolyte membranes have recently attracted interest as electrolytes for fuel cells.

Polymer electrolyte membranes with complexes of alkaline polymers and strong acids are known from WO96/13872, for example. To produce these, an alkaline polymer, for example polybenzimidazole, is treated with a strong acid, such as phosphoric acid.

Furthermore, fuel cells whose membrane comprises inorganic support materials, such as for example glass-fibre fabrics or glass-fibre veils, which are saturated with phosphoric acid, are also known, for example from U.S. Pat. No. 4,017,664.

In the alkaline polymer membranes known in the prior art, the mineral acid (mostly concentrated phosphoric acid) used—to achieve the required proton conductivity—is usually added following the forming of the polyazole film. In doing so, the polymer serves as a support for the electrolyte consisting of the highly concentrated phosphoric acid. In the process, the polymer membrane fulfills further essential functions, particularly, it has to exhibit a high mechanical stability and serve as a separator for the two fuels mentioned at the outset.

An essential advantage of such a membrane doped with phosphoric acid is the fact that a fuel cell in which such a polymer electrolyte membrane is employed can be operated at temperatures above 100° C. without the humidification of the fuels otherwise necessary. This is due to the characteristic of the phosphoric acid to be able to transport the protons without additional water via the so-called Grotthus mechanism (K.-D. Kreuer, Chem. Mater. 1996, 8, 610-641).

Further advantages for the fuel cell system are achieved through the possibility of operation at temperatures above 100° C. On the one hand, the sensitivity of the Pt catalyst to gas impurities, in particular CO, is reduced substantially. CO is formed as a by-product in the reforming of hydrogen-rich gas from carbon-containing compounds, such as e.g. natural gas, methanol or petrol, or also as an intermediate product in the direct oxidation of methanol. Typically, the CO content of the fuel has to be lower than 100 ppm at temperatures <100° C. However, at temperatures in the range of from 150-2000, 10,000 ppm CO or more can also be tolerated (N. J. Bjerrum et. al., Journal of Applied Electrochemistry, 2001, 31, 773-779). This results in substantial simplifications of the upstream reforming process and therefore reductions of the cost of the entire fuel cell system.

The output of a membrane electrode unit produced with such membranes is described in WO 01/18894 and in Electrochimica Acta, Volume 41, 1996, 193-197 and amounts to less than 0.2 A/cm$^2$ with a platinum loading of 0.5 mg/cm$^2$ (anode) and 2 mg/cm$^2$ (cathode) and a voltage of 0.6 V. When using air instead of oxygen, this value drops to less than 0.1 A/cm$^2$.

A great advantage of fuel cells is the fact that, in the electrochemical reaction, the energy of the fuel is directly converted into electric power and heat. In the process, water is formed at the cathode as a reaction product. Heat is also produced in the electrochemical reaction as a by-product. In applications in which only the power for the operation of electric motors is utilised, such as e.g. in automotive applications, or as a versatile replacement of battery systems, part of the heat generated in the reaction has to be dissipated to prevent overheating of the system. Additional energy-consuming devices which further reduce the total electric efficiency of the fuel cell are then needed for cooling. In stationary applications, such as for the centralised or decentralised generation of electricity and heat, the heat can be used efficiently by existing technologies, such as e.g. heat exchangers. In doing so, high temperatures are aimed for to increase the efficiency. If the operating temperature is higher than 100° C. and the temperature difference between the ambient temperature and the operating temperature is high, it will be possible to cool the fuel cell system more efficiently, for example using smaller cooling surfaces and dispensing with additional devices, in comparison to fuel cells which have to be operated at less than 100° C. due to the humidification of the membrane.

According to the state of the art, membrane electrode units for such fuel cells are produced by compressing a sandwich-like structure made of two planar electrodes and a planar membrane arranged between the two electrodes up to a presettable pressing power, preferably at a high temperature. Between the electrode and the membrane an annular gasket can be arranged that seals against the environment but at the same time does not prevent a contact between the electrode and the membrane. Such a sandwich-like unit is then placed between two pressure plates relatively movable in opposite directions, which are then compressed up to a presettable peak pressure and thus form an adhesive compound of the unit. While doing so, a protective layer can be inserted between the pressure plates and the membrane electrode unit.

When using electrodes that are produced on the basis of carbon fibre tissues under controlled pressing power, however, the tissue structure (fibre prominences and valleys) of the electrode shows on to the membrane after compressing the membrane electrode unit. Therefore, it may occur that the fibre prominences of the electrode are superimposed on both sides of the membrane during the production of the membrane electrode unit. The pressing power within this area can thereby rise locally significantly, which again leads to crushing or shearing whereby the membrane is damaged. Thus, short circuits may emerge between the electrodes and an unwanted and harmful gas exchange through the membrane can take place. This again leads to a reduced performance and a shortened life time of the fuel cells. Moreover, during the installation of thus predamaged membranes in a stack the risk of crushing and shearing by a further compression in the insertion process is additionally increased.

The thickness of the MEUs is set more or less uncontrolled with the use of tissue or paper as electrode material. That means, that a product series with an acceptable thickness variance is hard to produce in an economically reasonable manner.

The task of the invention was therefore to provide a method which is at least partially not showing these disadvantages.

This task is solved according to the invention with the initially mentioned method of compressing until a presettable compression is achieved.

During the realisation of such a method according to the invention it has surprisingly been discovered that the membrane damages are smaller than in the pressure controlled method, that the open circuit voltage (OCV) of cells produced with the method according to the invention is higher than in those produced with the pressure controlled method and that a more consistent thickness of the membrane electrode units can be reached within one product series. Differences in the material properties of the membrane, the electrode and the gasket do not preponderate when compressing under controlled compression as much as when compressing under controlled pressure. Therefore, with the method according to the invention, a more consistent product can be produced than with the known method. It has particularly been shown that the electrical power of the MEUs produced according to the invention is more constant in operation. Additionally it has been found that the use of membranes containing mineral acids, particularly phosphoric acids, allows a better control or setting of the distribution or the acid within the membrane.

Therefore, the present invention relates to a method for the production of a membrane electrode unit in which one or more proton conductive polymer membranes are compressed with two or more electrodes, characterised in that the compressing is carried out until a presettable compression is achieved.

This method can be carried out with customary presses known to those skilled in the art, e.g., in such a way that one or more shims are placed between the pressure plates. The height of the shims thereby corresponds to the presettable compression. With a given initial thickness D of the membrane electrode unit before the compressing and a wanted compression of X %, the height H of the shims is H=D*(100−X)/100.

Alternatively, the pressing method can be carried out path-controlled. There, the pressure plates are moved towards each other with the help of an electronic control unit and a hydraulic or mechanical traversing unit that they have the space H to each other, as calculated above. Such methods are known to those skilled in the art, however, and therefore do not need further explanation.

Particular embodiments of the method according to the invention are disclosed in the following description and in the dependent claims. Single or several features of the invention disclosed in the preceding paragraphs may present individual inventions either for itself or in any combination with the features of the main claim and the features can also be used in any combination.

In a first particular embodiment of the method according to the invention the compressing is carried out at an elevated temperature. The expression "elevated temperature" shall be defined as the interval from room temperature to 200° C. in the context of this invention. Preferred are pressing temperatures of up to 40° C. to 220° C., in particular 60° C., up to 200° C., particularly preferably in the range of from 80° C. to 180° C., depending on the materials used. The elevated temperatures may be set with heated pressure plates, for example.

A further particular embodiment is characterised in that between the membrane and the electrode or each electrode one or more gaskets are arranged, preferably in the constructive marginal area.

A further particular embodiment is characterised in that the presettable compression value is selected in the interval from incl. 1 to 40%. A preferred interval comprises the values from 15 to 40%, particularly from 15 to 25%. This preferred interval is particularly advantageous for membranes doped with mineral acids. The compression herein is calculated as the quotient of the difference between the initial thickness of the individual elements and the final thickness of the resulting compound which is then divided by the sum of the initial thickness of the individual elements, and thereafter multiplied by 100 in order to obtain the unit "%". This may also be represented by the mathematical expression:

$$\% \text{ compression} = \frac{[\text{sum(initial thickness of elements)} - \text{compressed thickness}] \times 100}{\text{sum(initial thickness of elements)}}$$

A further particular embodiment is characterised in that the compressing until a presettable compression is achieved is carried out within a period from 1 to 100 seconds. Preferably, the compression which can be set is reached within a period of 20 seconds, more preferably within 10 seconds. The moment when the pressure plates exert pressure on the MEUs defines the beginning of the time interval. The pressure plates can then be held in this state for a further preselectable period in order to be driven apart and to release the blank afterwards. This further preselectable period may extend from 10 to 100 seconds, preferably from 15 to 50 seconds, especially preferrably approx. 30 seconds. These values depend on the hardness of the selected membrane.

A further particular embodiment is characterised in that the compressing is carried out at a compression speed in the range of 0.2 to 2%/s, at a maximum, however, of 20%/s. Measured in absolute speed of the pressure plates, a preferred maximum "compression speed" amounts to 0.2 millimeter per second with a typical MEU thickness of approx. 1 mm. At higher speeds the membranes risk to be damaged by crushing and shearing. Preferred absolute compression speeds lie in the range of 1 to 200 μm. With a typical MEU thickness of approx. 1 mm, compression speeds of 20 to 200 μm/s are particularly advantageous.

A further particular embodiment is characterized in that the compressing is carried out in ramps.

A further particular embodiment is characterized in that the polymer membrane shows protone conductivity.

A further particular embodiment is characterized in that a membrane electrode unit is compressed, comprising
at least one polymer membrane doped with at least one mineral acid containing at least one polymer with at least one basic hetero atom selected from the group O, S and/or N,
at least two electrodes,
where at least one electrode includes a catalyst containing at least one precious metal of the platinum group, in particular Pt, Pd, Ir, Rh, Os, Ru, and/or at least one precious metal Au and/or Ag.

In addition to the higher open circuit voltage, the membrane electrode unit produced according to the invention (in the following referred to as MEU according to the invention) provides high current intensities without the voltage being lowered too much. The membrane electrode units further exhibit good durability at high current intensities.

The polymer membrane included in the membrane electrode unit is formed preferably by polymers which comprise at least one nitrogen atom. These polymers are also called alkaline polymers. The alkalinity of the polymer can also be defined via the molar ratio of nitrogen atoms to carbon atoms. The scope of the present invention encompasses in particular such polymers whose molar ratio of nitrogen atoms to carbon atoms is in the range of from 1:1 to 1:100, preferably in the range of from 1:2 to 1:20. This ratio can be determined by elemental analysis.

Alkaline polymers, in particular polymers with at least one nitrogen atom, are known in professional circles. In general, polymers according to the invention with one nitrogen atom in the backbone and/or in the side chain can be used.

The polymers with one nitrogen atom include, for example, polyphosphazenes, polyimines, polyisocyanides, polyetherimine, polyaniline, polyamides, polyhydrazides, polyurethanes, polyimides, polyazoles and/or polyazines.

Preferably, the polymer membranes comprise polymers with at least one nitrogen atom used in a repeating unit. In this connection, it is also possible to use copolymers which, in addition to repeating units with one nitrogen atom, also comprise repeating units without a nitrogen atom.

According to a particular aspect of the present invention, alkaline polymers with at least one nitrogen atom are used. The term alkaline is known in professional circles in which this is to be understood in particular as Lewis and Brønstedt alkalinity.

The repeating unit in the alkaline polymer preferably contains an aromatic ring with at least one nitrogen atom. The aromatic ring is preferably a five- to six-membered ring with one to three nitrogen atoms which can be fused to another ring, in particular another aromatic ring.

Polymers based on polyazole generally contain recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII).

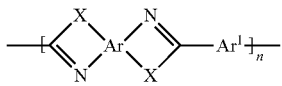

(I)

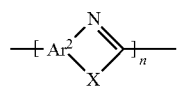

(II)

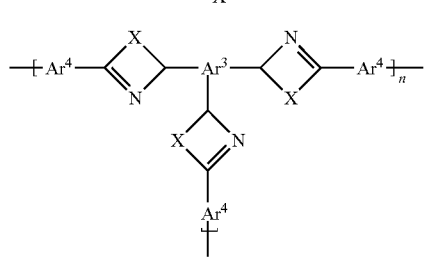

(III)

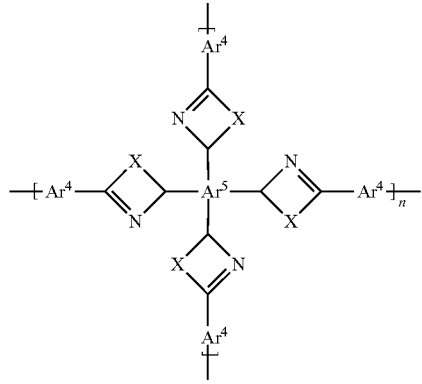

(IV)

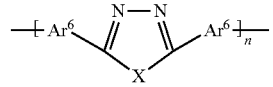

(V)

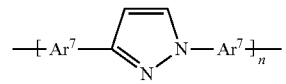

(VI)

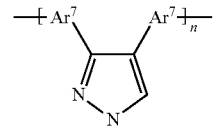

(VII)

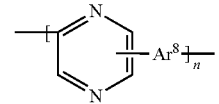

(VIII)

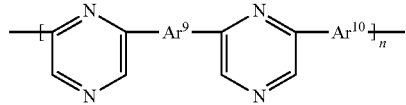

(IX)

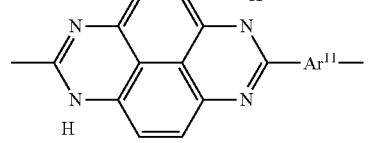

(X)

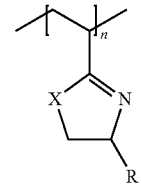

(XI)

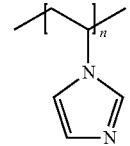

(XII)

-continued

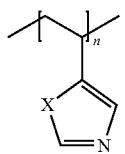
(XIII)

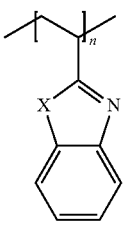
(XIV)

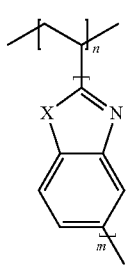
(XV)

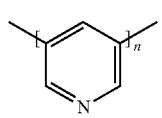
(XVI)

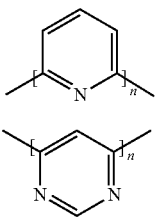
(XVII)

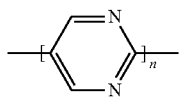
(XVIII)

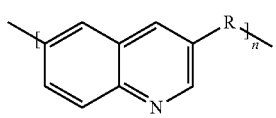
(XIX)

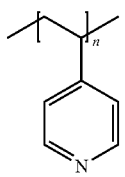
(XXI)

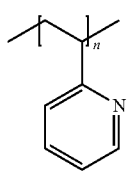
(XXII)

wherein

Ar are identical or different and represent a tetracovalent aromatic or heteroaromatic group which can be mononuclear or polynuclear, $Ar^1$ are identical or different and represent a bicovalent aromatic or heteroaromatic group which can be mononuclear or polynuclear, $Ar^2$ are identical or different and represent a bicovalent or tricovalent aromatic or heteroaromatic group which can be mononuclear or polynuclear, $Ar^3$ are identical or different and represent a tricovalent aromatic or heteroaromatic group which can be mononuclear or polynuclear, $Ar^4$ are identical or different and represent a tricovalent aromatic or heteroaromatic group which can be mononuclear or polynuclear, $Ar^5$ are identical or different and represent a tetracovalent aromatic or heteroaromatic group which can be mononuclear or polynuclear, $Ar^6$ are identical or different and represent a bicovalent aromatic or heteroaromatic group which can be mononuclear or polynuclear, $Ar^7$ are identical or different and represent a bicovalent aromatic or heteroaromatic group which can be mononuclear or polynuclear, $Ar^8$ are identical or different and represent a tricovalent aromatic or heteroaromatic group which can be mononuclear or polynuclear, $Ar^9$ are identical or different and represent a bicovalent or tricovalent or tetracovalent aromatic or heteroaromatic group which can be mononuclear or polynuclear, $Ar^{10}$ are identical or different and represent a bicovalent or tricovalent aromatic or heteroaromatic group which can be mononuclear or polynuclear, $Ar^{11}$ are identical or different and represent a bicovalent aromatic or heteroaromatic group which can be mononuclear or polynuclear, X are identical or different and represent oxygen, sulphur or an amino group which carries a hydrogen atom, a group having 1-20 carbon atoms, preferably a branched or unbranched alkyl or alkoxy group, or an aryl group as a further radical, R are identical or different and represent hydrogen, an alkyl group and an aromatic group, with the proviso that R in the formula (XX) is not hydrogen, and n and m are each an integer greater than or equal to 10, preferably greater than or equal to 100.

Aromatic or heteroaromatic groups preferred according to the invention are derived from benzene, naphthalene, biphenyl, diphenyl ether, diphenylmethane, diphenyldimethylmethane, bisphenone, diphenylsulphone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aziridine, phenazine, benzoquinoline, phenoxazine, phenothiazine, acridizine, benzopteridine, phenanthroline and phenanthrene which optionally also can be substituted.

In this case, $Ar^1, Ar^4, Ar^6, Ar^7, Ar^8, Ar^9, Ar^{10}, Ar^{11}$ can have any substitution pattern, in the case of phenylene, for example, $Ar^1, Ar^4, Ar^6, Ar^7, Ar^8, Ar^9, Ar^{10}, Ar^{11}$ can be ortho-, meta- and para-phenylene. Particularly preferred groups are derived from benzene and biphenylene which optionally also can be substituted.

Preferred alkyl groups are short-chain alkyl groups having 1 to 4 carbon atoms, e.g. methyl, ethyl, n- or i-propyl and t-butyl groups.

Preferred aromatic groups are phenyl or naphthyl groups. The alkyl groups and the aromatic groups can be substituted.

Preferred substituents are halogen atoms, e.g. fluorine, amino groups, hydroxy groups or short-chain alkyl groups, e.g. methyl or ethyl groups.

Polyazoles having recurring units of the formula (I) are preferred wherein the radicals X within one recurring unit are identical.

The polyazoles can in principle also have different recurring units wherein their radicals X are different, for example. It is preferable, however, that a recurring unit has only identical radicals X.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In another embodiment of the present invention, the polymer containing recurring azole units is a copolymer or a blend which contains at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer containing recurring azole units is a polyazole which only contains units of the formulae (I) and/or (II).

The number of recurring azole units in the polymer is preferably an integer greater than or equal to 10. Particularly preferred polymers contain at least 100 recurring azole units.

Within the scope of the present invention, polymers containing recurring benzimidazole units are preferred. Some examples of the most purposeful polymers containing recurring benzimidazole units are represented by the following formulae:

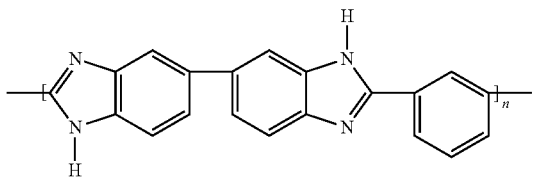
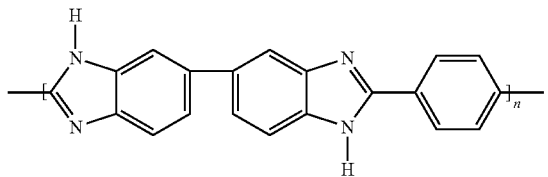
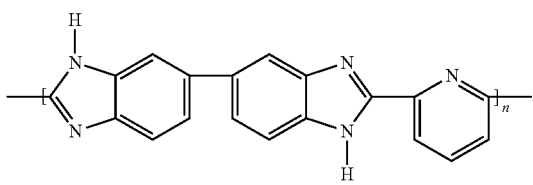
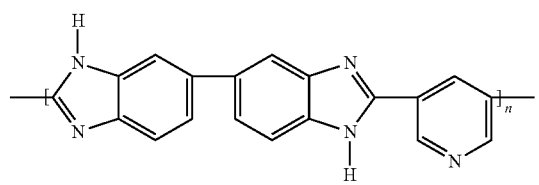
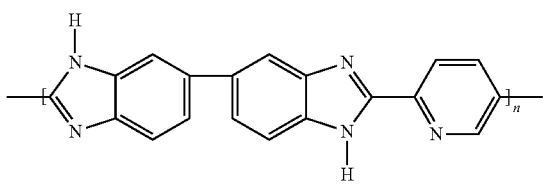
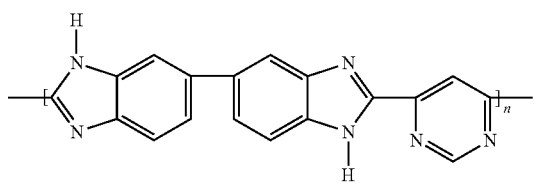
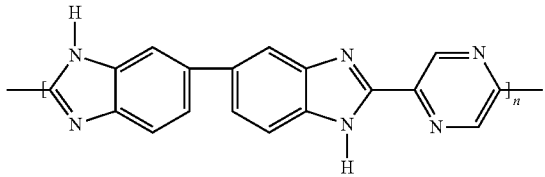
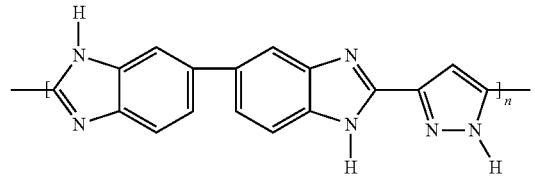
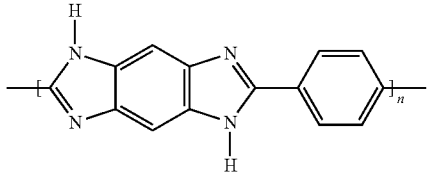
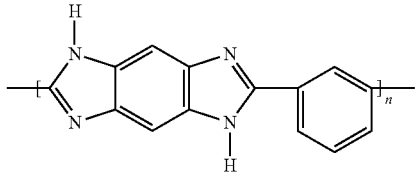

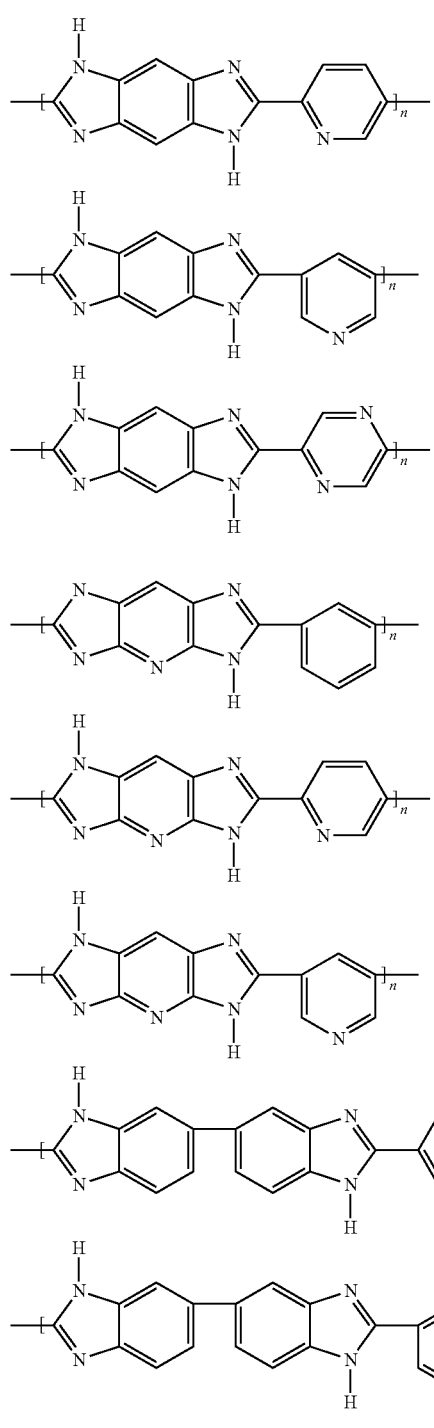
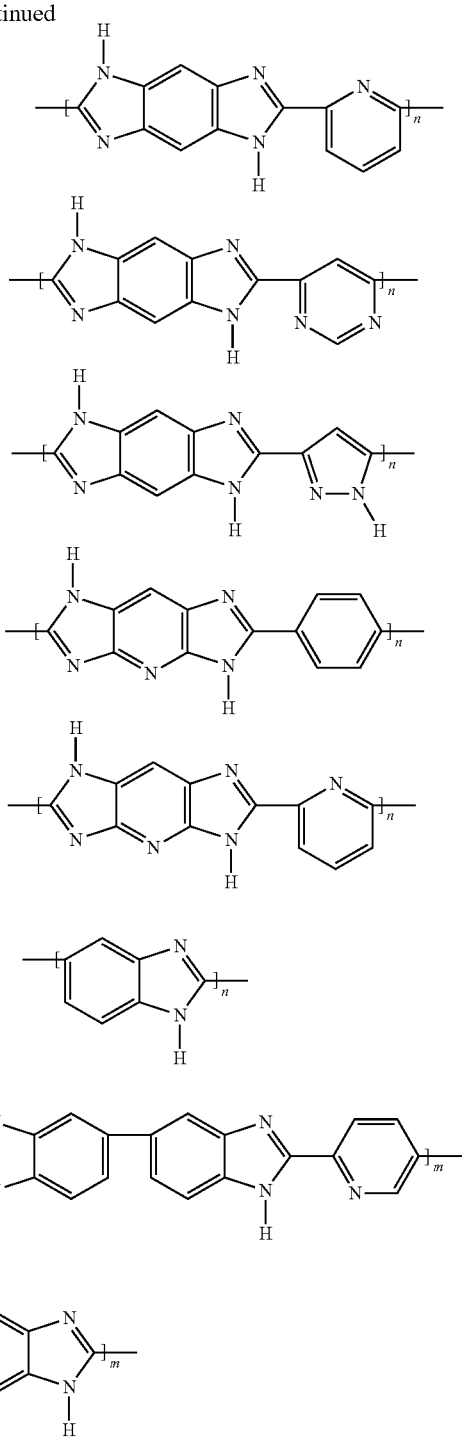

wherein n and m are each an integer greater than or equal to 10, preferably greater than or equal to 100.

Further preferred polyazole polymers are polyimidazoles, polybenzimidazole ether ketone, polybenzothiazoles, polybenzoxazoles, polytriazoles, polyoxadiazoles, polythiadiazoles, polypyrazoles, polyquinoxalines, poly(pyridines), poly(pyrimidines) and poly(tetrazapyrenes).

Preferred polyazoles are characterized by a high molecular weight. This applies in particular to the polybenzimidazoles. Measured as the intrinsic viscosity, this is in the range of from 0.3 to 10 dl/g, preferably 1 to 5 dl/g.

Celazole from the company Celanese is particularly preferred. The properties of polymer film and polymer membrane can be improved by screening the starting polymer, as described in German patent application No. 10129458.1.

Very particular preference is given to using para-polybenzimidazoles in the production of the polymer electrolyte membranes. In this connection, the polybenzimidazoles comprise in particular six-membered aromatic groups which are linked at the 1,4 position. Particular preference is given to using poly-[2,2'-(p-phenylene)-5,5'-bisbenzimidazole].

The polymer film used for the doping and based on alkaline polymers can comprise still more additives in the form of fillers and/or auxiliaries. Additionally, the polymer film can feature further modifications, for example by cross-linking, as described in German patent application No. 1010752.8 or in WO 00/44816. In a preferred embodiment, the polymer film used for the doping and consisting of an alkaline polymer and at least one blend component additionally contains a cross-linking agent, as described in German patent application No. 10140147.7. An essential advantage of such a system is the fact that higher doping levels and therefore a greater conductivity with sufficient mechanical stability of the membrane can be achieved.

In addition to the above-mentioned alkaline polymers, a blend of one or more alkaline polymers with another polymer can be used. In this case, the function of the blend component is essentially to improve the mechanical properties and reduce the cost of material. Here, polyethersulphone is a preferred blend component, as described in German patent application No. 10052242.4.

The preferred polymers which can be employed as the blend component include, amongst others, polyolefines, such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinyl amine, poly(N-vinyl acetamide), polyvinyl imidazole, polyvinyl carbazole, polyvinyl pyrrolidone, polyvinyl pyridine, polyvinyl chloride, polyvinylidene chloride, polytetrafluoroethylene, polyhexafluoropropylene, copolymers of PTFE with hexafluoropropylene, with perfluoropropylvinyl ether, with trifluoronitrosomethane, with sulphonyl fluoride vinyl ether, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular of norbornenes;
polymers having C—O bonds in the backbone, for example, polyacetal, polyoxymethylene, polyether, polypropylene oxide, polyepichlorohydrin, polytetrahydrofuran, polyphenylene oxide, polyether ketone, polyester, in particular polyhydroxyacetic acid, polyethyleneterephthalate, polybutyleneterephthalate, polyhydroxybenzoate, polyhydroxypropionic acid, polypivalolacton, polycaprolacton, polymalonic acid, polycarbonate;
Polymeric C—S bonds in the backbone, for example polysulphide ether, polyphenylenesulphide, polyethersulphone;
Polymeric C—N bonds in the backbone, for example polyimines, polyisocyanides, polyetherimine, polyaniline, polyamides, polyhydrazides, polyurethanes, polyimides, polyazoles and/or polyazines,
liquid crystalline polymers, in particular Vectra, as well as inorganic polymers, such as polysilanes, polycarbosilanes, polysiloxanes, polysilicic acid, polysilicates, silicons, polyphosphazenes and polythiazyl.

For the application in fuel cells with a long-term service temperature above 100° C., such blend polymers that have a glass transition temperature or Vicat softening point VST/A/50 of at least 100° C., preferably at least 150° C. and very particularly preferably at least 180° C., are preferred. In this connection, polysulphones with a Vicat softening point VST/A/50 of from 180° C. to 230° C. are preferred.

The preferred polymers include polysulphones, in particular polysulphone having aromatic groups in the backbone. According to a particular aspect of the present invention, preferred polysulphones and polyethersulphones have a melt volume rate MVR 300/21.6 of less than or equal to 40 cm$^3$/10 min, in particular less than or equal to 30 cm$^3$/10 min and particularly preferably less than or equal to 20 cm$^3$/10 min, measured in accordance with ISO 1133.

According to a particular aspect, the polymer membrane can comprise at least one polymer with aromatic sulphonic acid groups. Aromatic sulphonic acid groups are groups in which the sulphonic acid groups (—SO$_3$H) are bound covalently to an aromatic or heteroaromatic group. The aromatic group can be part of the backbone of the polymer or part of a side group wherein polymers having aromatic groups in the backbone are preferred. In many cases, the sulphonic acid groups can also be employed in the form of their salts. Furthermore, derivatives, for example esters, in particular methyl or ethyl esters, or halides of the sulphonic acids can be used which are converted to the sulphonic acid during operation of the membrane.

Preferred aromatic or heteroaromatic groups are derived from benzene, naphthalene, biphenyl, diphenyl ether, diphenylmethane, diphenyldimethylmethane, bisphenone, diphenylsulphone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aziridine, phenazine, benzoquinoline, phenoxazine, phenothiazine, acridizine, benzopteridine, phenanthroline and phenanthrene which optionally also can be substituted. Preferred substituents are halogen atoms, such as e.g. fluorine, amino groups, hydroxy groups or alkyl groups.

In this case, the substitution pattern can be in any form, in the case of phenylene, for example, it can be ortho-, meta- and para-phenylene. Particularly preferred groups are derived from benzene and biphenylene which optionally also can be substituted.

Preferred alkyl groups are short-chain alkyl groups having 1 to 4 carbon atoms, e.g. methyl, ethyl, n- or i-propyl and t-butyl groups.

Preferred aromatic groups are phenyl or naphthyl groups. The alkyl groups and the aromatic groups can be substituted.

The polymers modified with sulphonic acid groups preferably have a content of sulphonic acid groups in the range of from 0.5 to 3 meq/g, preferably 0.5 to 2 meq/g. This value is determined through the so-called ion exchange capacity (IEC).

To measure the IEC, the sulphonic acid groups are converted to the free acid. To this end, the polymer is treated in a known way with acid, removing excess acid by washing. Thus, the sulphonated polymer is initially treated for 2 hours in boiling water. Subsequently, excess water is dabbed off and the sample is dried at 160° C. in a vacuum drying cabinet at p<1 mbar for 15 hours. Then, the dry weight of the membrane is determined. The polymer thus dried is then dissolved in DMSO at 80° C. for 1 h. Subsequently, the solution is titrated with 0.1M NaOH. The ion exchange capacity (IEC) is then calculated from the consumption of acid to reach the equivalence point and from the dry weight.

Polymers with sulphonic acid groups covalently bound to aromatic groups are known in professional circles. Polymers with aromatic sulphonic acid groups can, for example, be produced by sulphonation of polymers. Methods for the sulphonation of polymers are described in F. Kucera et al., Polymer Engineering and Science 1988, Vol. 38, No. 5, 783-792. In this connection, the sulphonation conditions can be chosen such that a low degree of sulphonation develops (DE-A-19959289).

With regard to polymers having aromatic sulphonic acid groups whose aromatic radicals are part of the side group, particular reference shall be made to polystyrene derivatives. The document U.S. Pat. No. 6,110,616 for instance describes copolymers of butadiene and styrene and their subsequent sulphonation for use in fuel cells.

Furthermore, such polymers can also be obtained by polyreactions of monomers which comprise acid groups. Thus, perfluorinated polymers as described in U.S. Pat. No. 5,422,411 can be produced by copolymerisation of trifluorostyrene and sulphonyl-modified trifluorostyrene.

According to a particular aspect of the present invention, thermoplastics stable at high temperatures which include sulphonic acid groups bound to aromatic groups are employed. In general, such polymers have aromatic groups in the backbone. Thus, sulphonated polyether ketones (DE-A-4219077, WO96/01177), sulphonated polysulphones (J. Membr. Sci. 83 (1993), p. 211) or sulphonated polyphenylenesulphide (DE-A-19527435) are preferred.

The polymers set forth above which have sulphonic acid groups bound to aromatic groups can be used individually or as a mixture wherein mixtures having polymers with aromatic groups in the backbone are particularly preferred.

The molecular weight of the polymers having sulphonic acid groups bound to aromatic groups can vary widely, depending on the type of polymer and its processibility. Preferably, the weight average of the molecular weight $M_w$ is in the range of from 5000 to 10,000,000, in particular 10,000 to 1,000,000, particularly preferably 15,000 to 50,000. According to a particular aspect of the present invention, polymers with sulphonic acid groups bound to aromatic groups which have a low polydispersity index $M_w/M_n$ are. Preferably, the polydispersity index is in the range of from 1 to 5, in particular 1 to 4.

To further improve the properties in terms of application technology, the flat material can feature fillers, in particular proton-conducting fillers.

Non-limiting examples of proton-conducting fillers are sulphates, such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates, such as $Zr_3(PO_4)_4$, $Zr(HPO_4)_2$, $HZr_2(PO_4)_3$, $UO_2PO_4.3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacid, such a $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenites and arsenides, such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, phosphides, such as ZrP, TiP, HfP oxides, such as $Al_2O_3$, $Sb_2O_5$, $ThO_2$, $SnO_2$, $ZrO_2$, $MoO_3$ silicates, such as zeolites, zeolites($NH_4$+), phyllosilicates, tectosilicates, H-natrolites, H-mordenites, $NH_4$-analcines, $NH_4$-sodalites, $NH_4$-gallates, H-montmorillonites acids, such as $HClO_4SbF_5$ fillers, such as carbides, in particular SiC, $Si_3N_4$, fibres, in particular glass fibres, glass powders and/or polymer fibres, preferably based on polyazoles.

These additives can be included in the proton-conducting polymer membrane in usual amounts, however, the positive properties of the membrane, such as great conductivity, long service life and high mechanical stability, should not be affected too much by the addition of too large amounts of additives. Generally, the membrane comprises not more than 80% by weight, preferably not more than 50% by weight and particularly preferably not more than 20% by weight, of additives.

To produce the polymer film, the polymer components are initially dissolved or suspended, as described in the applications cited above, for example DE No. 10110752.8 or WO 00/44816, and subsequently used for the production of the polymer films. Furthermore, the polymer films in accordance with DE No. 10052237.8 can be produced continuously.

Alternatively, the formation of the film can take place in accordance with the method described in the Japanese application No. Hei 10-125560.

In this, the solution is poured into a cylinder with a cylindrical interior surface and the cylinder is then set into rotation. At the same time, the solvent is allowed to evaporate via the centrifugal force caused by the rotation, thereby forming a cylindrical polymer film on the interior surface of the cylinder wherein the film has a thickness that is largely uniform.

With this method, the alkaline polymer having a uniform matrix can be formed. This method described in the Japanese patent application Hei 10-125560 is also part of the present description.

Then, the solvent is removed. This can take place by methods known to the person skilled in the art, for example by drying. The film made of alkaline polymer or polymer blend is subsequently impregnated or doped with a strong acid, preferably a mineral acid, wherein the film can be treated as described previously in the German patent application No. 10109829.4. This variant is beneficial to exclude interactions of the residual solvent with the barrier layer.

To this end, the film comprising at least one polymer with at least one nitrogen atom is immersed in a strong acid such that the film is impregnated with the strong acid and becomes a proton-conducting membrane. For this, the preferably alkaline polymer is usually immersed in a highly concentrated strong acid at a temperature of at least 35° C. for a period of several minutes up to several hours.

Mineral acid, in particular phosphoric acid and/or sulphuric acid, is used as the strong acid.

Within the scope of the present description, "phosphoric acid" means polyphosphoric acid ($H_{n+2}P_nO_{3n+1}$ (n >1), which usually has a content of at least 83%, calculated as $P_2O_5$ (by acidimetry), phosphonic acid ($H_3PO_3$), orthophosphoric acid ($H_3PO_4$), pyrophosphoric acid ($H_4P_2O_7$), triphosphoric acid ($H_5P_3O_{10}$) and metaphosphoric acid. The phosphoric acid, in particular orthophosphoric acid, preferably has a concentration of at least 80 percent by weight, particularly preferably a concentration of at least 85 percent by weight, even more preferably a concentration of at least 87 percent by weight and very particularly preferably a concentration of at least 89 percent by weight. It is to be understood that the reason for this is that the preferably alkaline polymer can be impregnated with a greater number of molecules of the strong acid at an increasing concentration of the strong acid.

The obtained polymer electrolyte membrane is proton-conducting. After the doping, the degree of doping should be, expressed as mole of acid per repeating unit, greater than 6, preferably greater than 8 and very particularly preferably greater than 9.

Instead of the polymer membranes based on preferably alkaline polymers and produced by classical methods, it is also possible to use the polyazole-containing polymer membranes, as described in the German patent applications No. 10117686.4, 10144815.5, 10117687.2. Such polymer electrolyte membranes provided with at least one barrier layer are also an object of the present invention.

Polymer membranes can preferably be obtained by a method
comprising the steps of
i) preparation of a mixture comprising
  polyphosphoric acid
  at least one polyazole and/or at least one or more compounds which are suitable for the formation of polyazoles with action of heat in accordance with step ii),
ii) heating the mixture obtainable in accordance with step i) under inert gas to temperatures of up to 400° C.,
iii) applying a layer using the mixture in accordance with step i) and/or ii) to a support,
iv) treatment of the membrane formed in step iii).

To this end, one or more compounds can be added to the mixture in accordance with step i), which are suitable for the formation of polyazoles with action of heat in accordance with step ii).

For this, mixtures are suitable which comprise one or more aromatic and/or heteroaromatic tetramino compounds and one or more aromatic and/or heteroaromatic carboxylic acids or their derivatives, which comprise at least two acid groups per carboxylic acid monomer. Furthermore, one or more aromatic and/or heteroaromatic diaminocarboxylic acids can be used for the preparation of polyazoles.

The aromatic and heteroaromatic tetramino compounds include, amongst others, 3,3',4,4'-tetraminobiphenyl, 2,3,5,6-tetraminopyridine, 1,2,4,5-tetraminobenzene, 3,3',4,4'-tetraminodiphenyl sulphone, 3,3',4,4'-tetraminodiphenyl ether, 3,3',4,4'-tetraminobenzophenone, 3,3',4,4'-tetraminodiphenylmethane and 3,3',4,4'-tetraminodiphenyldimethylmethane Of these, 3,3',4,4'-tetraminobiphenyl, 2,3,5,6-tetraminopyridine and 1,2,4,5-tetraminobenzene are particularly preferred.

Furthermore, the mixture i) can comprise aromatic and/or heteroaromatic carboxylic acids. These are dicarboxylic acids and tricarboxylic acids and tetracarboxylic acids or their esters or their anhydrides or their acid halides, especially their acid halides and/or acid bromides. Preferably, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, 2,2-bis-(4-carboxyphenyl)hexafluoropropane, 4,4'-stilbenedicarboxylic acid, 4-carboxycinnamic acid or their C1-C20 alkyl esters or C5-C12 aryl esters or their acid anhydrides or their acid chlorides.

Very particular preference is given to using mixtures which comprise dicarboxylic acids, the acid radicals of which are in the para position, such as for example terephthalic acid.

The heteroaromatic carboxylic acids are heteroaromatic dicarboxylic acids and tricarboxylic acids and tetracarboxylic acids or their esters or their anhydrides. Heteroaromatic carboxylic acids are understood to mean aromatic systems which contain at least one nitrogen, oxygen, sulphur or phosphorus atom in the aromatic group. Preferably, these are pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid and their C1-C20 alkyl esters or C5-C12 aryl esters or their acid anhydrides or their acid chlorides.

Furthermore, the mixture i) can also comprise aromatic and heteroaromatic diaminocarboxylic acids. These include, amongst others, diaminobenzoic acid, 4-phenoxycarbonyl-3',4'-diaminodiphenyl ether and their monohydrochloride and dihydrochloride derivatives.

The mixture produced in step i) preferably comprises at least 0.5% by weight, in particular 1 to 30% by weight and particularly preferably 2 to 15% by weight, of monomers for the preparation of polyazoles.

According to another aspect of the present invention, the mixture produced in step i) comprises compounds which are suitable for the formation of polyazoles with action of heat in accordance with step ii), these compounds being obtainable by reaction of one or more aromatic and/or heteroaromatic tetramino compounds with one or more aromatic and/or heteroaromatic carboxylic acids or their derivatives, which contain at least two acid groups per carboxylic acid monomer, or of one or more aromatic and/or heteroaromatic diaminocarboxylic acids in the melt at temperatures of up to 400° C., in particular up to 350° C., preferably up to 280° C. The compounds to be used for the preparation of these prepolymers were set forth above.

Furthermore, monomers which comprise covalently bound acid groups can be used for the preparation of polyazoles. These include, amongst others, aromatic and heteroaromatic dicarboxylic acids or their derivatives which include at least one phosphonic acid group, for example 2,5-dicarboxyphenylphosphonic acid, 2,3-dicarboxyphenylphosphonic acid, 3,4-dicarboxyphenylphosphonic acid and 3,5-dicarboxyphenylphosphonic acid; aromatic and heteroaromatic dicarboxylic acids or their derivatives which include at least one sulphonic acid group, in particular 2,5-dicarboxyphenylsulphonic acid, 2,3-dicarboxyphenylsulphonic acid, 3,4-dicarboxyphenylsulphonic acid and 3,5-dicarboxyphenylsulphonic acid; aromatic and heteroaromatic diaminocarboxylic acids which comprise at least one phosphonic acid group, for example 2,3-diamino-5-carboxyphenylphosphonic acid, 2,3-diamino-6-carboxyphenylphosphonic acid and 3,4-diamino-6-carboxyphenylphosphonic acid; aromatic and heteroaromatic diaminocarboxylic acids which comprise at least one sulphonic acid group, for example 2,3-diamino-5-carboxyphenylsulphonic acid, 2,3-diamino-6-carboxyphenylsulphonic acid and 3,4-diamino-6-carboxyphenylsulphonic acid.

A polyazole membrane produced in accordance with the method set forth above can include the optional components set forth above. These include in particular blend polymers and fillers. Blend polymers can, amongst other things, be dissolved, dispersed or suspended in the mixture obtained in accordance with step i) and/or step ii). In this connection, the weight ratio of polyazole to polymer (B) is preferably in the range of from 0.1 to 50, preferably from 0.2 to 20, particularly preferably from 1 to 10; however, this should not constitute a limitation. If the polyazole is only formed in step ii), it is possible to arrive at the weight ratio by calculations based on the weight of the monomers for the formation of the polyazole in which the compounds released in the condensation, for example water, are to be taken into account.

To further improve the properties in terms of application technology, fillers, in particular proton-conducting fillers, and additional acids can additionally be added to the membrane. The addition can be performed in step i), step ii) and/or step iii), for example. Furthermore, these additives can also be added after the polymerisation in accordance with step iv), if they are in the form of a liquid. These additives were described above.

The polyphosphoric acid used in step i) is a customary polyphosphoric acid as is available, for example, from Riedel-de Haen. The polyphosphoric acids $H_{n+2}P_nO_{3n+1}$ (n>1) usually have a concentration of at least 83%, calculated as $P_2O_5$ (by acidimetry). Instead of a solution of the monomers, it is also possible to produce a dispersion/suspension.

The mixture obtained in step i) is, in accordance with step ii), heated to a temperature of up to 400° C., in particular 350° C., preferably up to 280° C., in particular 100° C. to 250° C. and particularly preferably in the range of from 200° C. to 250° C. For this, an inert gas, for example nitrogen, or a noble gas, such as neon, argon, is used.

The mixture produced in step i) and/or step ii) can additionally also contain organic solvents. These can affect the processibility in a positive way. For example, the rheology of the solution can be improved such that this can be more easily extruded or applied with a doctor blade.

The formation of the flat structure in accordance with step iii) is performed by means of measures known per se (pouring, spraying, application with a doctor blade, extrusion) which are known from the prior art of polymer film production. Every support that is considered as inert under the conditions is suitable as a support. These supports include in particular films made of polyethylene terephthalate (PET), polytetrafluoroethylene (PTFE), polyhexafluoropropylene, copolymers of PTFE with hexafluoropropylene, polyimides, polyphenylenesulphides (PPS) and polypropylene (PP). Furthermore, the formation of the membrane can also be performed directly on the electrode provided with a barrier layer.

The thickness of the flat structure in accordance with step iii) is preferably between 10 and 4000 µm, preferably between 15 and 3500 µm, in particular between 20 and 3000 µm, particularly preferably between 30 and 1500 µm und very particularly preferably between 50 and 1200 µm.

The treatment of the membrane in step iv) is performed in particular at temperatures in the range of from 0° C. to 150° C., preferably at temperatures between 10° C. and 120° C., in particular between room temperature (20° C.) and 90° C., in the presence of moisture or water and/or steam. The treatment is preferably performed at normal pressure, but can also be carried out with action of pressure. It is essential that the treatment takes place in the presence of sufficient moisture whereby the polyphosphoric acid present contributes to the solidification of the membrane by means of partial hydrolysis with formation of low molecular weight polyphosphoric acid and/or phosphoric acid.

The partial hydrolysis of the polyphosphoric acid in step iv) leads to a solidification of the membrane and to a reduction in the layer thickness and the formation of a membrane. The solidified membrane generally has a thickness of between 15 and 3000 µm, preferably 20 and 2000 µm, in particular between 20 and 1500 µm.

The upper temperature limit for the treatment in accordance with step iv) is typically 150° C. With extremely short action of moisture, for example from overheated steam, this steam can also be hotter than 150° C. The duration of the treatment is substantial for the upper limit of the temperature.

The partial hydrolysis (step iv)) can also take place in climatic chambers wherein the hydrolysis can be specifically controlled with defined moisture action. In this connection, the moisture can be specifically set via the temperature or saturation of the surrounding area in contact with it, for example gases such as air, nitrogen, carbon dioxide or other suitable gases, or steam. The duration of the treatment depends on the parameters chosen as aforesaid.

Furthermore, the duration of the treatment depends on the thickness of the membrane.

Typically, the duration of the treatment amounts to a few seconds to minutes, for example with action of overheated steam, or up to whole days, for example in the open air at room temperature and lower relative humidity. Preferably, the duration of the treatment is 10 seconds to 300 hours, in particular 1 minute to 200 hours.

If the partial hydrolysis is performed at room temperature (20° C.) with ambient air having a relative humidity of 40-80%, the duration of the treatment is 1 to 200 hours.

The membrane obtained in accordance with step iv) can be formed in such a way that it is self-supporting, i.e. it can be detached from the support without any damage and then directly processed further, if applicable.

The treatment in accordance with step iv) leads to curing of the coating. If the membrane is directly formed on the electrode, the treatment in accordance with step iv) is performed until the coating exhibits a sufficient hardness so that it can be pressed to form a membrane electrode unit. A sufficient hardness is given when a membrane treated accordingly is self-supporting. In many cases, however, a lesser hardness is sufficient. The hardness determined in accordance with DIN 50539 (microhardness measurement) is generally at least 1 mN/mm$^2$, preferably at least 5 mN/mm$^2$ and very particularly preferably at least 50 mN/mm$^2$; however, this should not constitute a limitation.

The concentration and the amount of phosphoric acid and therefore the conductivity of the polymer membrane can be set via the degree of hydrolysis, i.e. the duration, temperature and ambient humidity. The concentration of the phosphoric acid is given as mole of acid per mole of repeating unit of the polymer. Within the scope of the present invention, a concentration (mole of phosphoric acid, based on a repeating unit of the formula (III), i.e. polybenzimidazole) between 13 and 80, in particular between 15 and 80 is preferred. Only with very much difficulty or not at all is it possible to obtain such high degrees of doping (concentrations) by doping polyazoles with commercially available orthophosphoric acid.

Preferred polymer membranes show high proton conductivity. This is at least 0.1 S/cm, preferably at least 0.11 S/cm, in particular at least 0.12 S/cm at temperatures of 120° C. If the membranes comprise polymers with sulphonic acid groups, the membranes also show high conductivity at a temperature of 70° C. The conductivity depends, amongst other things, on the content of sulphonic acid groups of the membrane. The higher this proportion, the better is the conductivity at low temperatures. In this connection, a membrane according to the invention can be humidified at low temperatures. To this end, for example, the compound employed as the energy source, for example hydrogen, can be provided with a proportion of water. In many cases, however, the water formed by the reaction is sufficient to achieve a humidification.

The specific conductivity is measured by means of impedancy spectroscopy in a 4-pole arrangement in potentiostatic mode and using platinum electrodes (wire, diameter of 0.25 mm). The distance between the current-collecting electrodes is 2 cm. The spectrum obtained is evaluated using a simple model comprised of a parallel arrangement of an ohmic resistance and a capacitor. The cross-section of the specimen of the membrane doped with phosphoric acid is measured immediately before mounting the specimen. To measure the temperature dependency, the measurement cell is brought to the desired temperature in an oven and regulated using a Pt-100 thermocouple arranged in the immediate vicinity of the specimen. After the temperature has been reached, the specimen is kept at this temperature for 10 minutes before beginning the measurement.

A membrane electrode unit according to the invention comprises, in addition to the polymer membrane, at least two electrodes which are each in contact with the membrane.

Generally, the electrode comprises a gas diffusion layer. The gas diffusion layer in general exhibits electron conductivity. Flat, electrically conductive and acid-resistant structures are commonly used for this. These include, for example, carbon-fibre paper, graphitised carbon-fibre paper, carbon-fibre fabric, graphitised carbon-fibre fabric and/or flat structures which were rendered conductive by addition of carbon black.

Furthermore, the electrode contains at least one catalyst layer comprising at least one precious metal of the platinum group, in particular Pt, Pd, Ir, Rh, Os, Ru, and/or at least one precious metal Au and/or Ag Furthermore, it would be an advantage, if the electrode included at least one catalyst layer having at least one precious metal of the platinum group, in particular Pt, Pd, Ir, Rh, Os, Ru, and/or at least one precious metal Au and/or Ag at least one metal less precious according to the electrochemical series as the metal mentioned in (i.), in particular selected from the group of Fe, Co, Ni, Cr, Mn, Zr, Ti, Ga, V.

Preferably, the catalyst is formed in the form of an alloy of the metals (i) and (ii). In addition to the alloy, further catalytically active substances, in particular precious metals of the platinum group, i.e. Pt, Pd, Ir, Rh, Os, Ru, or also the precious metals Au and Ag, can be used. Furthermore, the oxides of the above-mentioned precious metals and/or non-precious metals can also be employed.

The catalytically active particles which comprise the above-mentioned substances can be employed as metal powder, so-called black precious metal, in particular platinum and/or platinum alloys. Such particles generally have a size in the range of from 5 nm to 200 nm, preferably in the range of from 7 nm to 100 nm.

Furthermore, the metals can also be employed on a support material. Preferably, this support comprises carbon which particularly can be used in the form of carbon black, graphite or graphitised carbon black. Furthermore, electrically conductive metal oxides, such as for example, $SnO_x$, $TiO_x$, or phosphates, such as e.g. $FePO_x$, $NbPO_x$, $Zr_y(PO_x)_z$, can be used as support material. In this connection, the indices x, y and z designate the oxygen or metal content of the individual compounds which can lie within a known range as the transition metals can be in different oxidation stages.

The content of these metal particles on a support, based on the total weight of the bond of metal and support, is generally in the range of from 1 to 80% by weight, preferably 5 to 60% by weight and particularly preferably 10 to 50% by weight; however, this should not constitute a limitation. The particle size of the support, in particular the size of the carbon particles, is preferably in the range of from 20 to 100 nm, in particular 30 to 60 nm. The size of the metal particles present thereon is preferably in the range of from 1 to 20 nm, in particular 1 to 10 nm and particularly preferably 2 to 6 nm.

The sizes of the different particles represent mean values and can be determined via transmission electron microscopy or X-ray powder diffractometry.

The catalyst layer has a thickness in the range of from 0.1 to 50 μm.

The membrane electrode unit according to the invention has a catalyst loading of 0.1 and 10 $g/m^2$) based on the surface area of the polymer membrane.

The weight ratio of the precious metals of the platinum group or of Au and/or Ag to the metals less precious according to the electrochemical series is between 1:100 and 100:1.

The catalytically active particles set forth above can generally be obtained commercially.

The production of the catalysts is described in U.S. Pat. No. 392,512, JP06007679A940118 or EP450849A911009, for example.

The catalyst can, amongst other things, be applied to the gas diffusion layer. Subsequently, the gas diffusion layer provided with a catalyst layer can be bonded with a polymer membrane to obtain a membrane electrode unit according to the invention.

This membrane can then be bonded with a gas diffusion layer. In this connection, it is also possible to use a gas diffusion layer provided with a catalyst layer. In general, however, a gas diffusion layer which does not comprise any catalyst is sufficient.

To apply at least one catalyst layer to a polymer membrane, several methods can be employed. For example, a support can be used in step iii) which is provided with a coating containing a catalyst to provide the layer formed in step iii) or iv) with a catalyst layer.

In this connection, the membrane can be provided with a catalyst layer on one side or both sides. If the membrane is provided with a catalyst layer only on one side, the opposite side of the membrane has to be pressed together with an electrode which comprises a catalyst layer. If both sides of the membrane are to be provided with a catalyst layer, the following methods can also be applied in combination to achieve an optimal result.

In the membrane electrode unit according to the invention, the catalysts contained in the electrode or the catalyst layer adjacent to the gas diffusion layer at the side of the cathode and anode differ. In a particularly preferred embodiment of the invention, at least the cathode side comprises a catalyst containing i. at least one precious metal of the platinum group, in particular Pt, Pd, Ir, Rh, Os, Ru, and/or at least one precious metal Au and/or Ag ii. at least one metal less precious according to the electrochemical series as the metal mentioned in (i.), in particular selected from the group of Fe, Co, Ni, Cr, Mn, Zr, Ti, Ga, V.

According to the invention, the catalyst layer can be applied by a method in which a catalyst suspension is employed. Additionally, powders which comprise the catalyst can be used.

The catalyst suspension contains a catalytically active substance. These were described above.

Furthermore, the catalyst suspension can contain customary additives. These include, amongst others, fluoropolymers, such as e.g. polytetrafluoroethylene (PTFE), thickeners, in particular water-soluble polymers, such as e.g. cellulose derivatives, polyvinyl alcohol, polyethylene glycol, and surface-active substances.

The surface-active substances include in particular ionic surfactants, for example salts of fatty acids, in particular sodium laurate, potassium oleate; and alkylsulphonic acids, salts of alkylsulphonic acids, in particular sodium perfluorohexanesulphonate, lithium perfluorohexanesulphonate, ammonium perfluorohexanesulphonate, perfluorohexanesulphonic acid, potassium nonafluorobutanesulphonate, as well as non-ionic surfactants, in particular ethoxylated fatty alcohols and polyethylene glycols.

Furthermore, the catalyst suspension can comprise components that are liquid at room temperature. These include, amongst others, organic solvents which can be polar or non-polar, phosphoric acid, polyphosphoric acid and/or water. The catalyst suspension preferably contains 1 to 99% by weight, in particular 10 to 80% by weight, of liquid components.

The polar organic solvents include in particular alcohols, such as ethanol, propanol and/or butanol.

The organic, non-polar solvents include, amongst others, known thinning agents for thin layers, such as the thinning agent for thin layers 8470 from the company DuPont which comprises oils of turpentine.

Fluoropolymers, in particular tetrafluoroethylene polymers, represent particularly preferred additives. According to a particular embodiment of the present invention, the weight ratio of fluoropolymer to catalyst material comprising at least one precious metal and optionally one or more support materials is greater than 0.1, this ratio preferably lying within the range of from 0.2 to 0.6.

The catalyst suspension can be applied to the membrane by customary methods. Depending on the viscosity of the suspension which can also be in the form of a paste, several methods are known by which the suspension can be applied. Methods for coating films, fabrics, textiles and/or paper, in particular spraying methods and printing methods, such as for example screen and silk screen printing methods, inkjet printing methods, application with rollers, in particular anilox rollers, application with a slit nozzle and application with a doctor blade, are suitable. The corresponding method and the viscosity of the catalyst suspension depend on the hardness of the membrane.

The viscosity can be controlled via the solids content, especially the proportion of catalytically active particles, and the proportion of additives. The viscosity to be adjusted depends on the method of application of the catalyst suspension, the optimal values and the determination thereof being familiar to the person skilled in the art.

Depending on the hardness of the membrane, an improvement of the bond of catalyst and membrane can be effected by heating and/or pressing. Additionally, the bond between membrane and catalyst improves through a treatment in accordance with step iv).

Furthermore, the application of a catalyst layer can be carried out at the same time as the treatment of the membrane in accordance with step iv) until the membrane is self-supporting. This can take place, for example, by applying a catalyst suspension containing water to the flat structure in accordance with step iii). Here, the suspension can be sprayed onto the flat surface in accordance with step iii) in the form of fine droplets. In addition to water, the suspension can also contain further solvents and/or thickeners. Depending on the water content, the curing of the membrane is performed in accordance with step iv). Accordingly, the water content can be within wide ranges. The water content preferably is in the range of from 0.1 to 99, in particular 1 to 95% by weight, based on the catalyst suspension.

According to a particular aspect of the present invention, the catalyst layer is applied by a powder method. In this connection, a catalyst powder is used which can contain additional additives which were exemplified above.

To apply the catalyst powder, spraying methods and screening methods, amongst others, can be employed. In the spraying method, the powder mixture is sprayed onto the membrane via a nozzle, for example a slit nozzle. Generally, the membrane provided with a catalyst layer is subsequently heated to improve the bond between catalyst and membrane. The heating process can be performed via a hot roller, for example. Such methods and devices for applying the powder are described in DE 195 09 748, DE 195 09 749 and DE 197 57 492, amongst others.

In the screening method, the catalyst powder is applied to the membrane by a vibrating screen. A device for applying a catalyst powder to a membrane is described in WO 00/26982. After applying the catalyst powder, the bond of catalyst and membrane can be improved by heating and/or the step iv). In this connection, the membrane provided with at least one catalyst layer can be heated to a temperature in the range of from 50 to 200° C., in particular 100 to 180° C.

Furthermore, the catalyst layer can be applied by a method in which a coating containing a catalyst is applied to a support and the coating containing a catalyst and present on the support is subsequently transferred to a polymer membrane. As an example, such a method is described in WO 92/15121.

The support provided with a catalyst coating can be produced, for example, by preparing a catalyst suspension described above. This catalyst suspension is then applied to a backing film, for example made of polytetrafluoroethylene. After applying the suspension, the volatile components are removed.

The transfer of the coating containing a catalyst can be performed by hot pressing, amongst others. To this end, the composite comprising a catalyst layer and a membrane as well as a backing film is heated to a temperature in the range of from 50° C. to 200° C. and pressed together with a pressure of 0.1 to 5 MPa. In general, a few seconds are sufficient to join the catalyst layer to the membrane. Preferably, this period of time is in the range of from 1 second to 5 minutes, in particular 5 seconds to 1 minute.

According to a particular embodiment of the present invention, the catalyst layer has a thickness in the range of from 1 to 1000 μm, in particular from 5 to 500, preferably from 10 to 300 μm. This value represents a mean value which can be determined by averaging the measurements of the layer thickness from photographs that can be obtained with a scanning electron microscope (SEM).

According to a particular embodiment of the present invention, the membrane provided with at least one catalyst layer comprises 0.1 to 10.0 mg/cm$^2$, preferably 0.3 to 6.0 mg/cm$^2$ and particularly preferably 0.3 to 3.0 mg/cm$^2$. These values can be determined by elemental analysis of a flat specimen.

Furthermore, the membrane which can also be provided with a catalyst layer can further be cross-linked by action of heat in the presence of oxygen. This curing of the membrane additionally improves the properties of the membrane. To this end, the membrane can be heated to a temperature of at least 150° C., preferably at least 200° C. and particularly preferably at least 250° C. In this step of the method, the oxygen concentration usually is in the range of from 5 to 50% by volume, preferably 10 to 40% by volume; however, this should not constitute a limitation.

The cross-linking can also take place by action of IR or NIR (IR=infrared, i.e. light having a wavelength of more than 700 nm; NIR=near-IR, i.e. light having a wavelength in the range of from about 700 to 2000 nm and an energy in the range of from about 0.6 to 1.75 eV), respectively. Another method is β-ray irradiation. In this connection, the irradiation dose is from 5 and 200 kGy.

Depending on the degree of cross-linking desired, the duration of the cross-linking reaction can be within a wide range. Generally, this reaction time is in the range of from 1 second to 10 hours, preferably 1 minute to 1 hour; however, this should not constitute a limitation.

A membrane electrode unit according to the invention exhibits a surprisingly high power density. According to a particular embodiment, preferred membrane electrode units accomplish a current density of at least 0.3 A/cm$^2$, preferably 0.4 A/cm$^2$, particularly preferably 0.5 A/cm$^2$. This current density is measured in operation with pure hydrogen at the anode and air (approx. 20% by volume of oxygen, approx. 80% by volume of nitrogen) at the cathode, with standard pressure (1013 mbar absolute, with an open cell outlet) and a cell voltage of 0.6 V. In this connection, particularly high temperatures in the range of from 150-200° C., preferably 160-180° C., in particular 170° C. can be applied.

The power densities mentioned above can also be achieved with a low stoichiometry of the fuel gases on both sides. According to a particular aspect of the present invention, the stoichiometry is less than or equal to 2, preferably less than or equal to 1.5, very particularly preferably less than or equal to 1.2.

According to a particular embodiment of the present invention, the catalyst layer has a low content of precious metals. The content of precious metals of a preferred catalyst layer which is comprised by a membrane according to the invention is preferably not more than 2 mg/cm$^2$, in particular not more than 1 mg/cm$^2$, very particularly preferably not more than 0.5 mg/cm$^2$. According to a particular aspect of the present invention, one side of a membrane exhibits a higher metal content than the opposite side of the membrane. Preference is given to the metal content of the one side being at least twice as high as the metal content of the opposite side.

Figure 3:
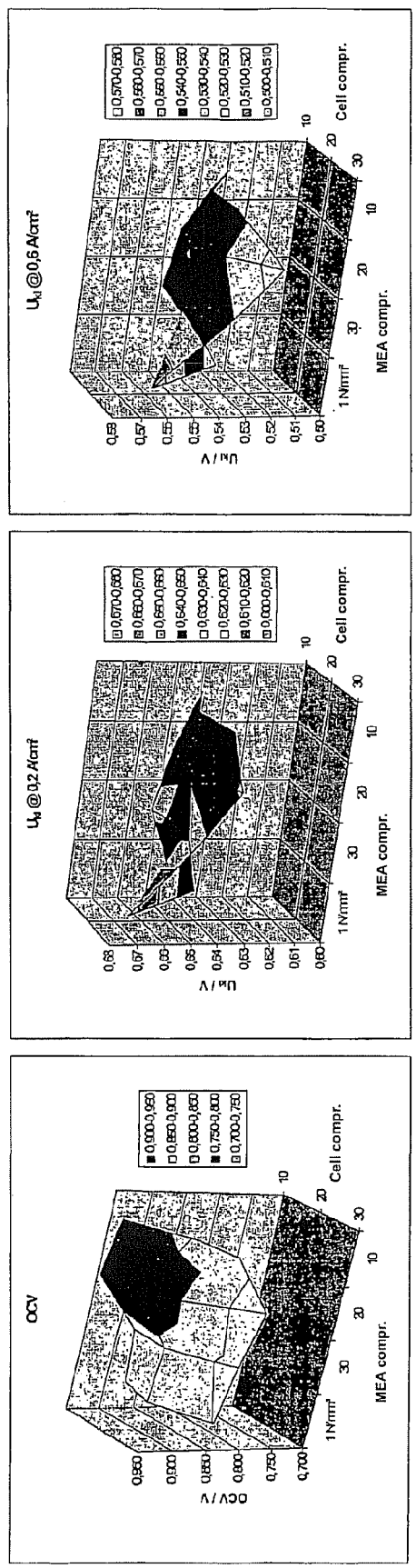

The method according to the invention will be further described with the FIGS. 1 to 3. A limitation of the invention in any way is not indended.

FIG. 1 shows in a cross-sectional schematic illustration the structure of a device for compressing a membrane electrode unit FIG. 2 shows a table with the results of compressing membrane electrode units under three different conditions FIG. 3 shows a graphic illustration of the results given in FIG. 2.

Between two pressure plates 5 relatively movable in opposite directions of a press, which is not further described, a membrane electrode unit MEU is placed for compressing corresponding to the method according to the invention. The MEU comprises a planar membrane 1 that is arranged between two electrodes 2, which are planar as well. Between the membrane 1 and the electrodes 2 another planar gasket can be arranged having a cavity and thus forming an electrode space, which is sealed against the environment. Between the pressure plates 5 and the electrodes 2 an incompressible protective layer 4 can be arranged in order to prevent a damage on the pressure plates 5 by possibly leaking mineral acid. According to the invention, there are one or more shims 3 of the height H are arranged between the pressure plates 5 that ensure that the pressure plates 5 can be moved towards each other only up to the space H. This results in the maximum compression of the MEU. The height H is sized in such a manner that, once the pressure plates 5 are compressed to the space H, the compression requested shows with the known thickness of the membrane 1, the electrodes 2 and, if need be, the gaskets and the protective layer 4. As the individual components of the MEU can be produced separately, their thickness may be precisely measured in advance.

The chronological course of the space between the pressure plates 5 may be formed as a ramp, the steepness of which can be preset. For compressions at an elevated temperature, the pressure plates 5 may be heated.

When compressing the MEU, the following processes are taking place: a pressure is exerted on the MEU, which brings about that, given a soft membrane 1, the membrane 1 is squeezed into the tissue of the electrodes 2 up to a certain extent. In so far as the membrane still has parts of oligomere bonds, they can be enriched at the marginal surface. Thus, a compression and an intimate compound are formed, which guarantees the MEUs coherence through the surface adhesion. That has the advantage, that the marginal surfaces between the polymer membrane 1 and the electrodes 2 is elevated. Polymer membranes doped with or containing one or more mineral acids are preferred as soft membranes. Particularly for membranes doped with phosphoric acid containing up to 90% phosphoric acid. When compressing MEUs with such membranes, a part of the mineral acid or phosphoric acid, if necessary with oligomere portions leaks into the electrodes improving the MEUs output. Here, the membrane 1 can be compressed by up to 75%.

The MEU compression can also take place in two stages, for example, by post compressing during the insertion in a fuel cell stack. Therefore a further particular embodiment of the method according to the invention is characterised in that one or more already compressed membrane electrode units can be compressed again in another pressing process. In this procedure, the total compression can reach values in the range from 20 to 40% compared to the original thickness of the individual components anode-membrane-cathode.

The tests described in the following serve as a further explanation of the invention. MEUs with the same membrane and electrode thickness at different compression rates were produced. Then they were inserted into an electrochemical measurement cell, compressed therein for a second time and added to a current-voltage-curve. The table in FIG. 2 shows the results, FIG. 3 their graphic illustration. In the first part of the figure the measured open circuit voltage (OCV) is shown as a function of the compression in the production (MEA compr.) and the compression in the cell (Cell compr.) A comparative test where a MEU was compressed with a preset pressure of 1N/mm$^2$ according to the known method is noted as well. The two other parts of the figure show the measured terminal voltage UkI at two different current densities as a function of the same parameters each. As described above, the results show that the open circuit voltage is higher in the MEUs compressed according to the invention than in those produced with pressure control. Furthermore, it can be seen that with an increasing post compression during the cell insertion, the open circuit voltage decreases. The optimum is achieved with a production compression of 20% and a cell compression of also 20%. The measuring results also display a declining terminal voltage at higher current densities with reducing insert compression. Its cause may be a slightly higher transition resistance between the electrodes and the bipolar plate, which serves for current collection.

For further information on membrane electrode units, reference is made to the technical literature, in particular the U.S. Pat. No. 4,191,618, U.S. Pat. No. 4,212,714 and U.S. Pat. No. 4,333,805. The disclosure contained in the above-mentioned citations [U.S. Pat. No. 4,191,618, U.S. Pat. No. 4,212,714 und U.S. Pat. No. 4,333,805] with respect to the structure and production of membrane electrode units as well as the electrodes, gas diffusion layers and catalysts to be chosen is also part of the description.

The invention claimed is:

1. A method for the production of a membrane electrode unit comprising the steps of:
   providing one or more proton conductive polymer membranes, each of the membranes having a thickness, at least one polymer membrane is doped with at least one mineral acid, said at least one polymer of said membrane having at least one basic hetero atom, said basic hetero atom is selected from the group consisting of: O, S, and/or N;
   providing two or more electrodes;
   compressing said proton conductive polymer membrane with said electrodes;
   wherein the compressing step is carried out until a presettable compression within the range of 1 to 40% is achieved and the thickness of the proton conductive polymer membrane is reduced.

2. The method according to claim 1, wherein the compressing step is carried out at an elevated temperature.

3. The method according to claim 1, wherein said presettable compression is achieved within a period of 1 to 100 seconds.

4. The method according to claim 1, wherein the compressing step is carried out at a compression speed in the range of 0.2 to 20%/s.

5. The method according to claim 1, wherein one or more previously compressed said membrane electrode units are further compressed in another process.

6. The method according to claim 1, wherein said membrane electrode unit further comprising:
   providing at least two electrodes, wherein at least one of the electrodes having a catalyst; said catalyst containing at least one precious metal is selected from the group consisting of: a member of the platinum group, Au, Ag; a member of the platinum group and Au; a member of the platinum group and Ag; or Au and/or Ag.

7. The method according to claim 1, wherein said polymer membrane is an alkaline polymer with at least one nitrogen atom in a repeating unit with at least one nitrogen atom.

8. The method according to claim 1, wherein said polymer membrane is an alkaline polymer having at least one aromatic ring with at least one nitrogen atom.

9. The method according to claim 1, wherein said polymer membrane is selected from the group consisting of: a polyimidazole, a polybenzimidazole, a polybenzothiazole, a polybenzoxazole, a polytriazole, a polyoxadiazole, a polythiadiazole, a polypyrazole, a polyquinoxaline, a poly(pyridine), a poly(pyrimidine), or a poly(tetrazapyrene).

10. The method according to claim 1, wherein said polymer membrane is comprised of a mixture comprising one or more alkaline polymers and one additional polymer.

11. The method according to claim 9 wherein said mineral acid is selected from the group consisting of phosphoric acid, sulphuric acid, or phosphoric acid and sulphuric acid.

12. The method according to claim 1, characterized in that said polymer membrane is comprised of para-polybenzimidazoles.

13. The method according to claim 6, wherein said catalyst is applied to said polymer membrane.

14. The method according to claim 6, wherein said catalyst having a thickness in the range of from 0.1 to 50 μm.

15. The method according to claim 6, wherein said catalyst is comprised of catalytically active particles having a size in the range of from 5 to 200 nm.

16. The method according to claim 6, wherein said catalyst is comprised of catalytically active particles on a support; said catalytically active particles ranging in size from 1 to 20 nm.

17. The method according to claim 6, wherein said electrodes is comprised of 0.1 to 10 g/m² of a catalytically active substance.

18. The method according to claim 6, wherein the weight ratio of the precious metals of the platinum group, Au, or Ag (i) to the metals less precious according to the electrochemical series (ii) is between 1:100 to 100:1.

19. The method according to claim 1 further comprising the use of one or more presses.

20. The method according to claim 1 wherein the presettable compression being with the range of 15-40%.

21. The method according to claim 1 wherein the presettable compression being with the range of 15-25%.

* * * * *